United States Patent [19]

Medalen

[11] 3,934,670
[45] Jan. 27, 1976

[54] VEHICLE FOR PROPULSION OF GARDENING IMPLEMENTS AND THE LIKE

[76] Inventor: Thord Erik Medalen, Vindarnas vag 2, S-582 72 Linkoping, Sweden

[22] Filed: Feb. 25, 1974

[21] Appl. No.: 445,691

[52] U.S. Cl. .................................. 180/52; 74/197
[51] Int. Cl.² ........................................ B60K 17/30
[58] Field of Search ............... 180/52, 51, 25, 14 B; 74/197

[56] References Cited
UNITED STATES PATENTS

| | | | |
|---|---|---|---|
| 652,648 | 6/1900 | Sommer | 180/51 |
| 653,264 | 7/1900 | Scott | 74/197 X |
| 930,384 | 8/1909 | Kelley | 74/197 |
| 2,219,533 | 10/1940 | Ross | 180/51 UX |
| 2,582,177 | 1/1952 | Swisher et al. | 180/14 B |
| 2,673,616 | 3/1945 | Moores | 180/51 |
| 3,678,770 | 7/1972 | Enters et al. | 74/197 |

Primary Examiner—M. Henson Wood, Jr.
Assistant Examiner—Michael J. Forman
Attorney, Agent, or Firm—Sughrue, Rothwell, Mion, Zinn & Macpeak

[57] ABSTRACT

A vehicle for propulsion of gardening, road-sweeping, snow-clearing and similar implements and having a single engine for propulsion of both the vehicle itself and an implement attached to the vehicle. The vehicle is provided with articulated steering, i.e., it has two wheeled, pivotably connected sections. The drive engine is mounted on the front section, which is also arranged to be rigidly connected with the implement. The vehicle is driven from at least one wheel of the rear section which wheel obtains its drive from a vertical axle driven by the engine and rotatably mounted in the pivot between the two sections of the vehicle and serving as a pivot pin. A regulatable gearing device is mounted between the said axle and the drive wheel or drive engine of the vehicle.

2 Claims, 3 Drawing Figures

VEHICLE FOR PROPULSION OF GARDENING IMPLEMENTS AND THE LIKE

BACKGROUND OF THE INVENTION

This invention relates to a vehicle for the propulsion of and operation of a gardening, roadsweeping, snow-clearing and similar implement, the vehicle having a single engine for propulsion of the vehicle itself and for operation of an implement or the like attached to the vehicle.

DESCRIPTION OF THE PRIOR ART

For effective gardening and for the cleaning of roads and paths, vehicles are needed for the propulsion of lawn mowers, sweeping devices, snow-blowing machines and the like. Several vehicles for these purposes are already on the market having different designs and varying prices. The majority of these vehicles, however, incorporate expensive components such as differential gears and complex gearboxes, and consequently the price of these vehicles is high and their maintenance is complicated and expensive. Moreover, the vehicles do not possess the flexibility and manoeuvrability which may be required in certain circumstances.

SUMMARY OF THE INVENTION

According to the present invention there is provided a vehicle for the propulsion of an operation of a gardening, road-sweeping, snow-clearing or similar implement with a single engine for the propulsion of the vehicle itself and for the operation of an implement or the like attached to the vehicle, said vehicle comprising two sections, said sections being wheeled and being pivotally connected by a pivot, the engine being mounted on one section, which is also arranged to be connected to the implement, the other section being provided with at least one wheel serving as a drive wheel for the vehicle, means being provided for driving the said drive wheel from a vertical axle driven by the engine and rotatably mounted in the pivot between the two sections of the vehicle and serving as a pivot pin, and a regulatable gearing device mounted between the said axle and the drive wheel of the vehicle or between the said axle and the drive motor of the vehicle.

In one embodiment of a vehicle in accordance with the invention the vehicle is provided with articulated steering, i.e., the vehicle has two sections which are pivotally connected for relative movement around a pivot, which enables the vehicle to turn with a turning circle of small radius. By attaching an implement, such as a lawn mower, to the front section of such a vehicle very good accessibility for the implement is attained.

In order to simplify the power transmission from the engine to the implement, which may be driven at a constant rate, the engine is also mounted in the front section of the vehicle. For effective propulsion of the vehicle it is, however, necessary for at least one wheel of the rear section to be driven, and in an embodiment of a vehicle in accordance with the invention the driving power for the said wheel is transmitted via a vertical axle which is driven by the engine and which is rotatably mounted in the pivot between the front and rear sections of the vehicle which axle is connected by a suitable drive mechanism or transmission to the wheel. For regulation of the speed of the vehicle a gearing device is mounted between the drive wheel and the said axle or alternatively between the axle and the engine.

In a preferred embodiment of the invention which permits an extremely simple arrangement of the power transmission system as well as very simple continuous regulation of the gearing, the said vertical axle is utilized as the driving shaft in a gearing device of the friction type, specifically a gearing device of a type which comprises a first flat disc mounted on the said shaft and a second disc rotatably mounted at right angles thereto which is made to engage with the flat surface of the first disc so that the rotational speed of the second disc which can travel along the supporting axle thereof will be governed by the distance of the point of contact of the discs from the centre of the rotating flat first disc. The supporting axle of the driven second disc is connected via a suitable transmission to the drive wheel of the vehicle. By this means a very simple gearing arrangement is provided, since the axle for transmission of the driving power between the front and rear sections of the vehicle can also be utilized as an operative part in the gearing device.

BRIEF DESCRIPTION OF THE DRAWINGS

In order that the invention may be more readily understood, and so that further features thereof may be appreciated, the invention will now be described by way of example, with reference to the accompanying drawings in which.

DESCRIPTION OF THE PREFERRED EMBODIMENT

Figure 1:
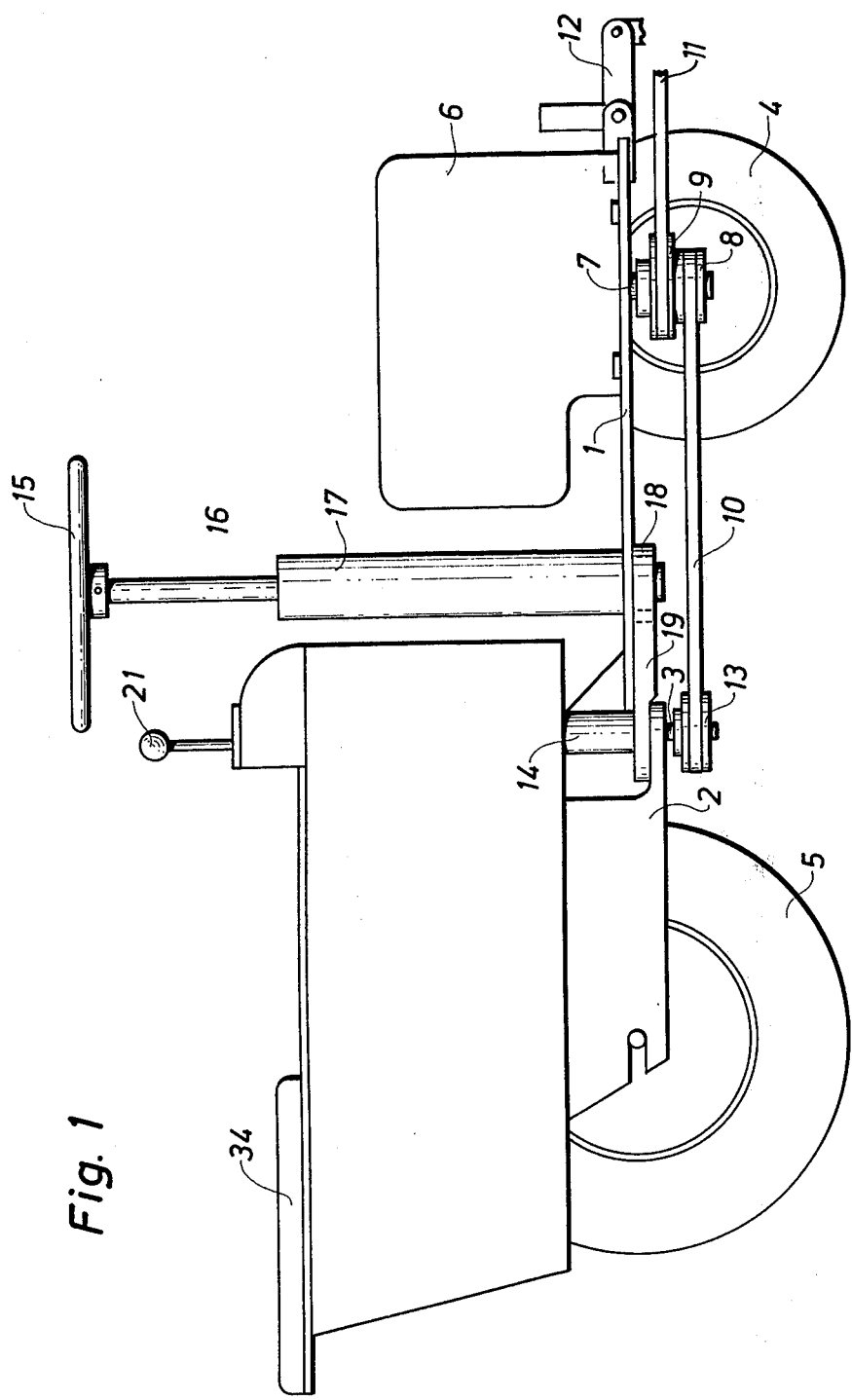
FIG. 1 is a diagrammatic side view of a vehicle in accordance with the invention, with one wheel removed.

Referring to FIG. 1, a vehicle for the propulsion of gardening implements and the like comprises a front section 1 and a rear section 2, which are pivotably connected by pivot means extending around an axle 3. The front section 1 is provided with two wheels 4 (only one of which is shown) and the rear section 2 is provided with one wheel 5. Also mounted on the front section is an engine 6 which drives an axle 7 which is provided with pulleys 8 and 9 adopted to accommodate V-belts 10 and 11 respectively. The V-belt 11 is intended for driving an implement (not shown) such as a lawn mower which may be mounted on an attachment means 12 at the front end of the vehicle. The V-belt 10 is arranged to drive the vertical axle 3 via a pulley 13. Mounted at the rear end of the front section 1 is a vertical tubular sleeve 14, through which the axle 3 driven by the engine 6 is passed.

The vehicle is steered by means of a steering wheel 15, which is connected via a steering column 16 mounted in a tubular sleeve 17 attached to the front section to, a gearwheel 18 secured to the lower end of the steering column, which gearwheel meshes with a toothed segment 19 fixed to the rear section of the vehicle. The reference numeral 34 denotes a seat for the driver.

Figure 2:
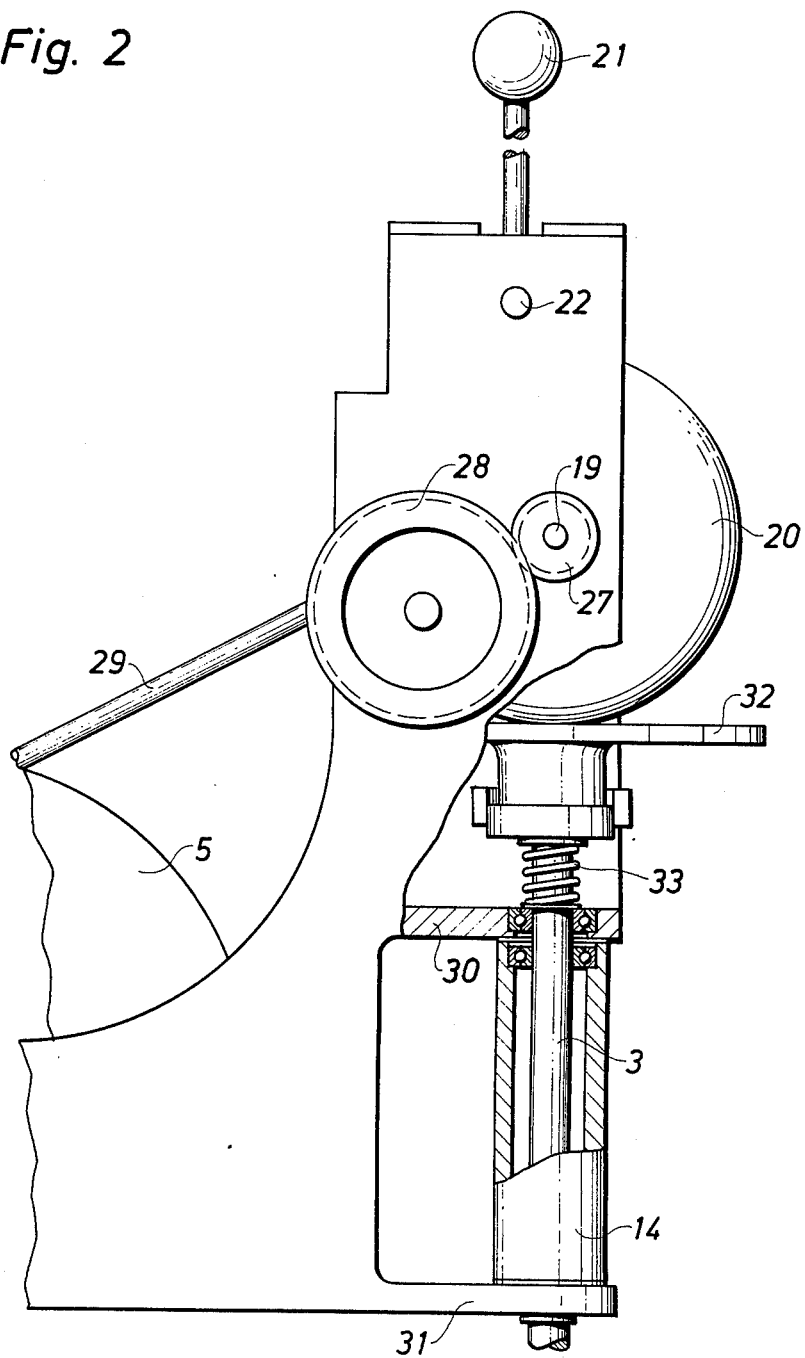
FIG. 2 is a side view, partly in section, of the pivot between the front and rear sections of the vehicle illustrated in FIG. 1.
Figure 3:
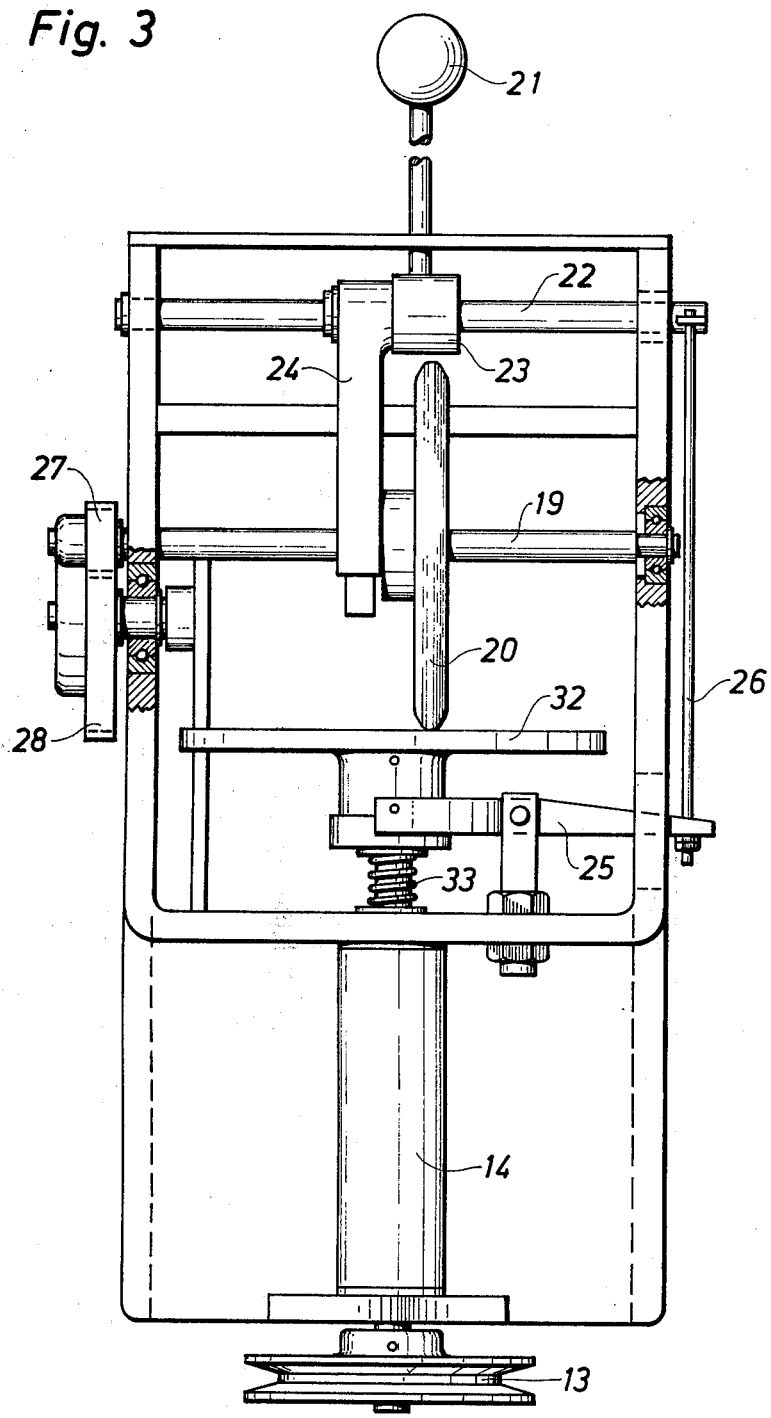
FIG. 3 is a rear view, partly in section of the power transmission and the pivot illustrated in FIG. 2.

FIGS. 2 and 3 show the arrangement for the power transmission between the front and rear sections of the vehicle and the gearing device in more detail. As can be seen from FIG. 2, the drive axle 3 is rotatably mounted in an upper flange 30 and a lower flange 31, which together form a fork. The tubular sleeve 14 provided on the front section of the vehicle is rotatably mounted about the axle 3 between the said flanges 30 and 31.

Mounted on the upper end of the axle 3 is a generally horizontal friction disc 32, having a flat upper surface which is urged in the upwards direction by a spring 33. When the disc 32 is in an uppermost position, it engages with a generally vertical friction disc 20 which is mounted on a horizontal support axle 19. The disc 20 is unrotatably connected with the support axle 19 but can be displaced laterally along the support axle 19, and the speed of the disc 20 — when the disc 32 is driven by the axle 3 at constant speed and the disc 20 is in contact with the disc 32 — will be varied according to the distance between the point of contact between the disc 32 and the disc 20 and the centre of the disc 32.

The position of the disc 20 along the axle 19 can be regulated by means of a lever 21, the lower end of which is provided with a sleeve 23, slidable along an axle 22 and unrotatable in relation to the axle 22. The sleeve 23 and the friction disc 20 are interconnected via a link 24. The friction disc 32 can be lowered out of engagement with the disc 20 against the action of a spring 33 with the aid of a lever mechanism 25, which is operable via a control rod 26, which is connected with the axle 22. The control rod 26 is so attached to the axle 22 that it will be pushed upwards or pulled downwards in response to turning of the said axle in one direction or the other, which can be done with the aid of the lever 21, since as described above the sleeve 23 is unrotatably connected with the said axle. By this means it is possible to achieve disengagement of the discs 20 and 32 and to prevent the discs 32 and 20 from being in mesh when the disc 20 passes the centre of the disc 32, which otherwise would result in excessive wear of the said discs.

The axle 19 driven via the friction disc 20 is connected at one end to a gearwheel 27, which meshes with a larger gearwheel 28, which via a chain 29 or belt drives the rear wheel 5 of the vehicle.

The gearing arrangement comprising the friction discs 32 and 20 represents a very simple and reliable gear, which is simple to operate and which allows stageless or continuous regulation of the speed of the vehicle as well as simple changing of the driving direction, since for this purpose it is only necessary to displace the disc 20 past the centre of the disc 32, so that it will interact with the other half of the disc 32. This together with the simple and very easy steering of the vehicle via the steering wheel 15, any turning movement of which is converted into a change of the angle between the longitudinal axes of the two sections of the vehicle through the gearwheel 18 and the toothed segment 19, results in the vehicle being very easily manoeuvred, which is of great importance, for instance when mowing uneven lawn areas. The steering arrangement also enables the vehicle to turn with a turning circle of very small radius. Since only one wheel is utilized to drive the vehicle, the utilization of differentials or the like is also avoided.

A feature which contributes to the simple construction and low maintenance cost of the vehicle is the simple and robust power transmission system between the front and rear sections of the vehicle. By utilizing the axle serving as a turning pivot for the vehicle sections also for the power transmission, which axle as shown in FIGS. 2 and 3 is additionally utilized as an operative part of the gearing arrangement, it is possible for the number of parts subjected to wear and requiring maintenance to be reduced to a minimum.

Whilst the invention has been described with reference to a vehicle for the propulsion of gardening implements such as lawn mowing devices it is to be understood that vehicles in accordance with the invention may be utilised for propelling and operating road-sweeping, snow-clearing or similar implements.

It is to be further understood that whilst in the specifically described embodiment the gearing arrangement is located between the vertical axle and the driven wheel of the vehicle the gearing arrangement could be located between the motor and the vertical axle, the vertical axle then being connected to the driven wheel by a suitable transmission.

What I claim is:

1. In a vehicle for the propulsion and operation of gardening, road-sweeping, snow-clearing and the like implements, said vehicle including first and second wheeled sections, the first section having an engine mounted thereon and the second section having at least one wheel adapted to be driven by the engine, means for pivotally connecting the first and second sections for articulated steering movement about a vertical axis, steering means mounted on one of the sections for implementing said steering movement, and a drive train extending between the sections for drivably coupling the engine to said one wheel, the improvements characterized by:

the means for pivotally connecting including a fork member extending from one of the sections and a tongue member extending from the other section and interposed in the fork member, and a vertical axle extending through the tongue and fork member and rotatably mounted therein to define said vertical axis, one end of said axle being coupled to the engine and the other end of said axle being coupled to said one wheel by a regulatable gearing device, wherein said axle serves both as a pivot pin rotatably connecting the first and second sections together and as a vertical drive shaft for coupling driving power from the first section to the second section.

2. A vehicle according to claim 1, wherein the gearing device consists of a stageless, continuously regulatable friction disc transmission, including a driven disc attached to the upper end of the vertical axle.

* * * * *